United States Patent
Pan et al.

(10) Patent No.: US 12,183,531 B2
(45) Date of Patent: Dec. 31, 2024

(54) SEALED INLINE FUSE MODULE

(71) Applicant: Suzhou Littelfuse OVS Co., Ltd., Suzhou (CN)

(72) Inventors: Shangchun Pan, Suzhou (CN); Renan Liu, Suzhou (CN); Dan Jin, Suzhou (CN)

(73) Assignee: Suzhou Littelfuse OVS Co., Ltd., Suzhou (CN)

( * ) Notice: Subject to any disclaimer, the term of this patent is extended or adjusted under 35 U.S.C. 154(b) by 305 days.

(21) Appl. No.: 17/942,335

(22) Filed: Sep. 12, 2022

(65) Prior Publication Data

US 2023/0129495 A1 Apr. 27, 2023

(30) Foreign Application Priority Data

Oct. 22, 2021 (CN) .......................... 202111235102.8

(51) Int. Cl.
| | |
|---|---|
| *H01H 85/165* | (2006.01) |
| *H01H 85/00* | (2006.01) |
| *H01H 85/20* | (2006.01) |
| *H01R 11/12* | (2006.01) |

(52) U.S. Cl.
CPC ........ *H01H 85/20* (2013.01); *H01H 85/0026* (2013.01); *H01H 85/165* (2013.01); *H01R 11/12* (2013.01); *H01H 2085/209* (2013.01)

(58) Field of Classification Search
CPC ............... H01H 85/20; H01H 85/0026; H01H 85/165–1755; H01H 85/2045; H01H 85/22; H01H 85/25; H01H 2085/209; H01R 11/12
See application file for complete search history.

(56) References Cited

U.S. PATENT DOCUMENTS

| | | | |
|---|---|---|---|
| 3,671,801 A | | 6/1972 | Masek |
| 5,314,354 A | | 5/1994 | Nomura |
| D414,749 S | | 10/1999 | Carr |
| 6,030,257 A | * | 2/2000 | Furuya ............... H01H 85/2045 439/620.26 |

(Continued)

FOREIGN PATENT DOCUMENTS

| | | |
|---|---|---|
| DE | 202004000526 U1 | 4/2004 |
| EP | 3671801 A1 | 6/2020 |

OTHER PUBLICATIONS

European Search Report and Written Opinion for the European Application No. EP22197361, mailed Apr. 3, 2023, 8 pages.

*Primary Examiner* — Jacob R Crum

(74) *Attorney, Agent, or Firm* — KDW Firm PLLC

(57) ABSTRACT

A fuse holder including a main body portion formed of an electrically insulating material, the main body portion defining a hollow interior and having first and second through holes formed in opposing rear and front walls thereof, respectively, the first and second through holes being aligned with one another, an integrated first electrical cable having a first ring terminal extending into the hollow interior of the main body portion, the first ring terminal disposed on the rear wall and aligned with the first through hole in the rear wall, and an integrated second electrical cable having a second ring terminal extending into the hollow interior of the main body portion, the second ring terminal disposed on the front wall and aligned with the second through hole in the front wall.

19 Claims, 5 Drawing Sheets

(56) References Cited

U.S. PATENT DOCUMENTS

| | | | |
|---|---|---|---|
| 7,192,319 B1* | 3/2007 | Rahman | H01H 85/044 439/766 |
| 2009/0140832 A1* | 6/2009 | Frohlke | H01H 85/201 337/187 |
| 2009/0309689 A1* | 12/2009 | Pavlovic | H01R 13/18 337/187 |
| 2017/0345604 A1 | 11/2017 | Shah | |
| 2019/0228940 A1* | 7/2019 | Bommersheim | H01H 85/205 |
| 2020/0203110 A1* | 6/2020 | Mantoan | H01H 85/143 |
| 2023/0080367 A1* | 3/2023 | Peppas | H05K 5/0247 361/56 |

\* cited by examiner

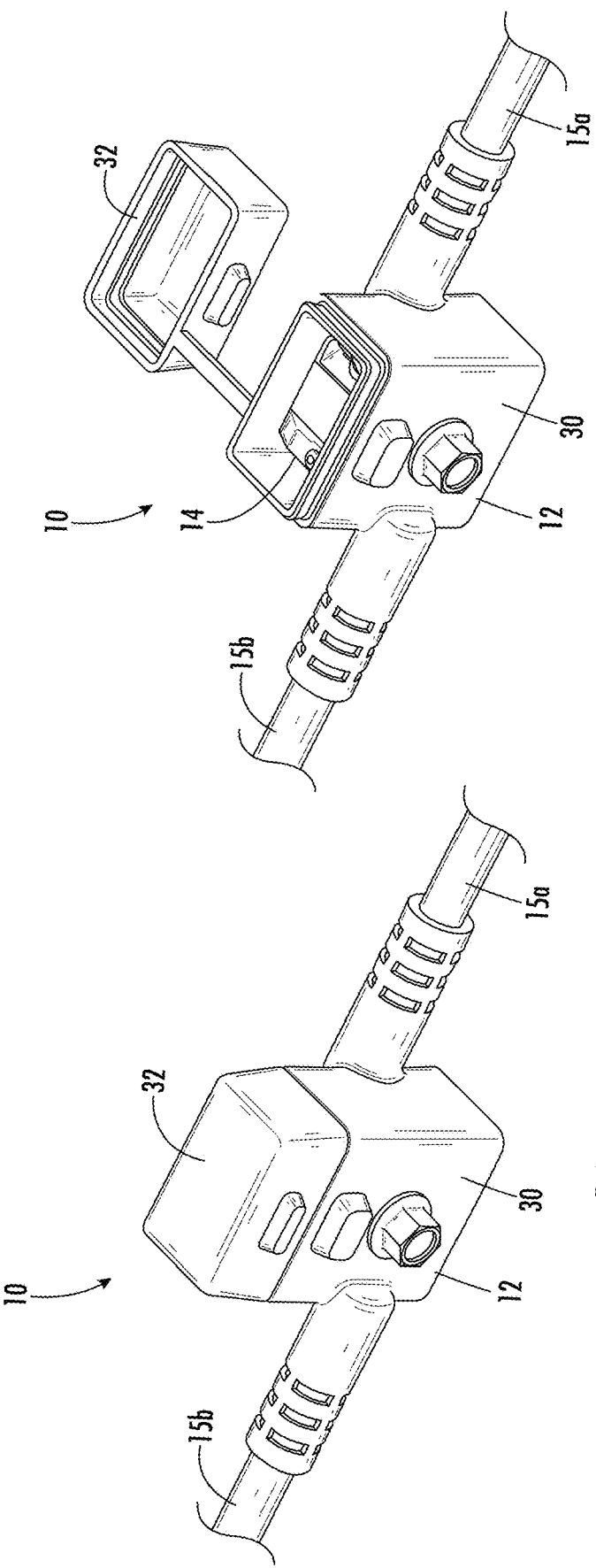

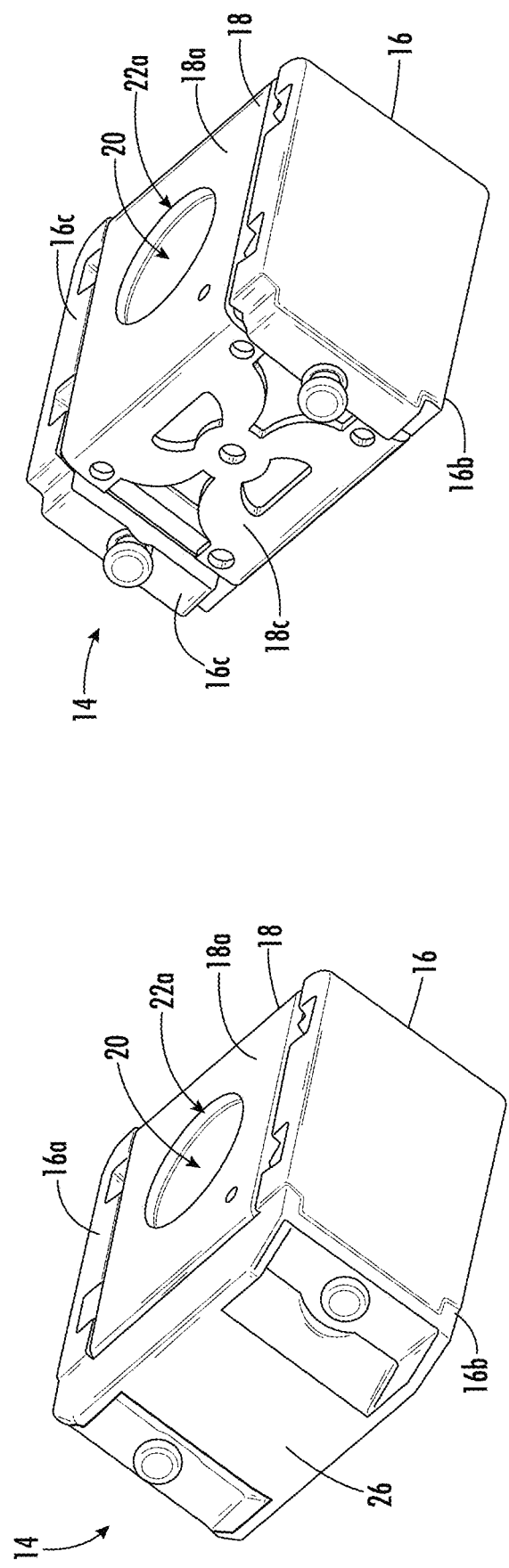
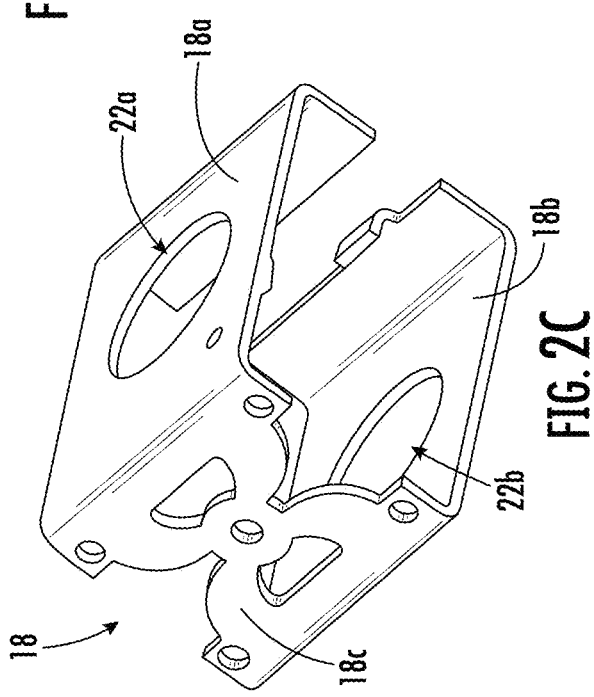

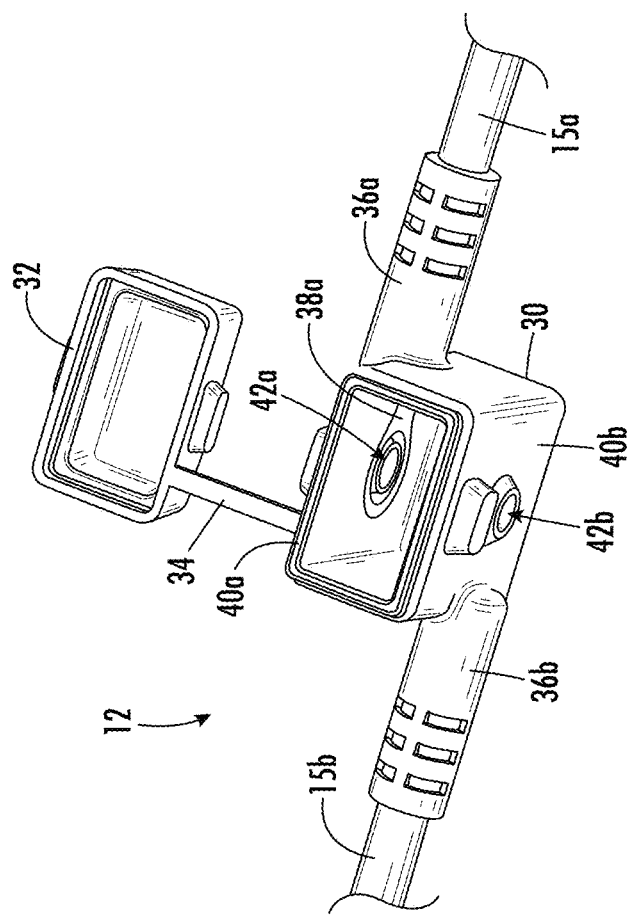
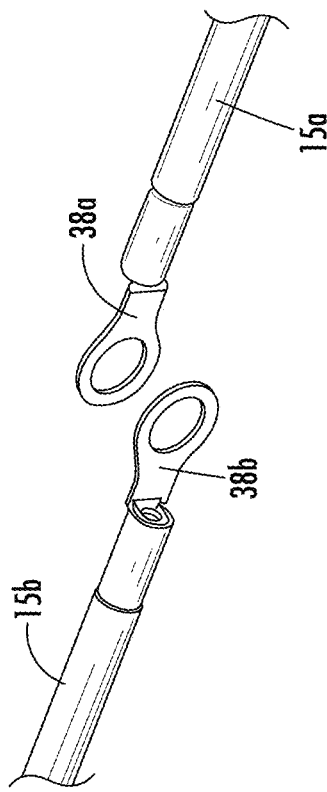
FIG. 3A
FIG. 3B

SEALED INLINE FUSE MODULE

FIELD OF THE DISCLOSURE

The disclosure relates generally to the field of circuit protection devices and relates more particularly to a sealed inline fuse module.

BACKGROUND OF THE DISCLOSURE

Fuse modules are sometimes implemented in vehicular applications. In a typical implementation, a fuse module is mounted directly to source of electrical power (e.g., a battery) to and is connected electrically in series between the source and a connected load. Upon the occurrence of an overcurrent condition, a fusible element within the fuse module melts, disintegrates, or otherwise opens to arrest the flow of current through the fuse module. The fuse module thereby prevents or mitigates electrical damage to the electrical source and/or the load that would otherwise result if the overcurrent condition were allowed to persist.

In various applications, it may be desirable to implement a fuse module at a location distant from an electrical source, in series between the source and a load. It may further be desirable for such a fuse module to be fluidically sealed from its environment. It may further be desirable for such a fuse module to have a fuse that is easily removable and replaceable.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a fuse module in accordance with an embodiment of the present disclosure may include a fuse holder having a main body portion formed of an electrically insulating material, the main body portion defining a hollow interior and having first and second through holes formed in opposing rear and front walls thereof, respectively, the first and second through holes being aligned with one another, an integrated first electrical cable having a first ring terminal extending into the hollow interior of the main body portion, the first ring terminal disposed on the rear wall and aligned with the first through hole in the rear wall, and an integrated second electrical cable having a second ring terminal extending into the hollow interior of the main body portion, the second ring terminal disposed on the front wall and aligned with the second through hole in the front wall. The fuse module may further include a fuse disposed within the fuse holder, the fuse having a mounting block formed of an electrically insulating material and having a through-hole extending therethrough, the through hole of the mounting block being aligned with the first and second through holes in the rear and front walls of the main body portion, and a fuse plate having a rear portion disposed on a rear surface of the mounting block, in contact with the first ring terminal, and having a first through hole aligned with the through hole of the mounting block, a front portion disposed on a front surface of the mounting block, in contact with the second ring terminal, and having a second through hole aligned with the through-hole of the mounting block, and a fusible element disposed adjacent a top surface of the mounting block and connecting the rear portion of the fuse plate to the front portion of the fuse plate. The fuse module may further include a bolt extending through the front wall, the second ring terminal, the front portion of the fuse plate, the mounting block, the rear portion of the fuse plate, the first ring terminal, and the rear wall, the bolt secured by a nut on the exterior of the rear wall.

An exemplary embodiment of a fuse holder in accordance with the present disclosure may include a main body portion formed of an electrically insulating material, the main body portion defining a hollow interior and having first and second through holes formed in opposing rear and front walls thereof, respectively, the first and second through holes being aligned with one another, an integrated first electrical cable having a first ring terminal extending into the hollow interior of the main body portion, the first ring terminal disposed on the rear wall and aligned with the first through hole in the rear wall, and an integrated second electrical cable having a second ring terminal extending into the hollow interior of the main body portion, the second ring terminal disposed on the front wall and aligned with the second through hole in the front wall.

BRIEF DESCRIPTION OF THE DRAWINGS

FIG. 1A is a perspective view illustrating a fuse module in accordance with an exemplary embodiment of the present disclosure;

FIG. 1B is a perspective view illustrating the fuse module shown in FIGS. 1A and 1B with a cover of the fuse module in an open position;

FIGS. 2A-2C are a series of perspective views illustrating a fuse of the fuse module shown in FIGS. 1A and 1B;

FIGS. 3A and 3B are perspective views illustrating a configuration of electrical cables of the fuse module shown in FIGS. 1A and 1B;

DETAILED DESCRIPTION

Figure 4A:
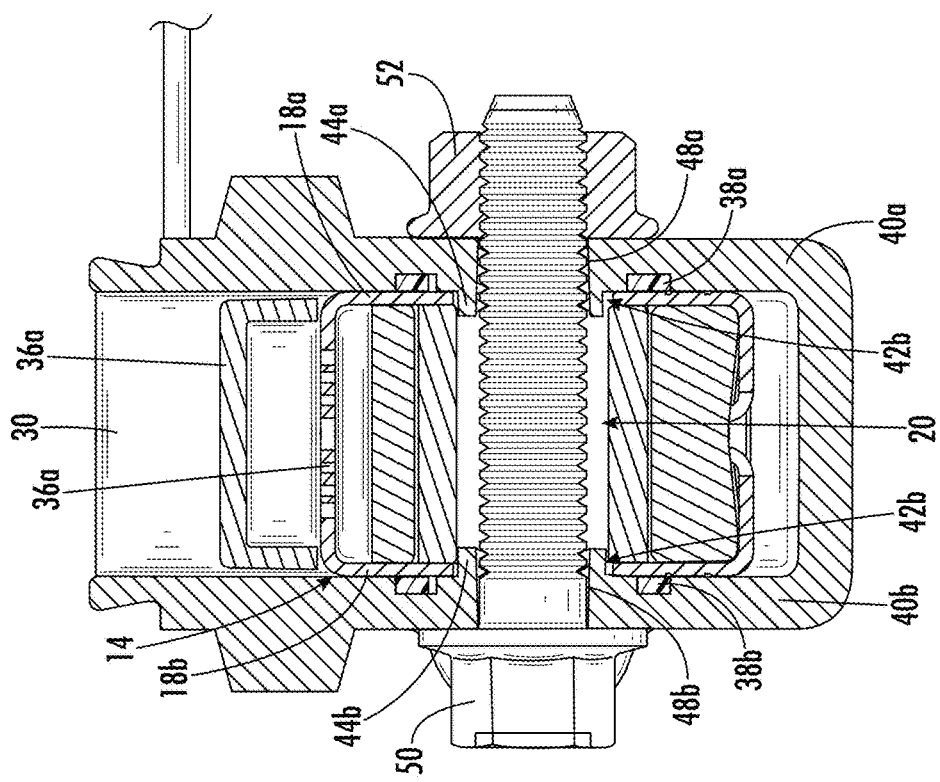
FIGS. 4A and 4B are cross-sectional views illustrating the fuse module shown in FIGS. 1A and 1B in an unfastened and fastened state, respectively.

A fuse module in accordance with the present disclosure will now be described more fully with reference to the accompanying drawings, in which preferred embodiments of the fuse module are presented. It will be understood, however, that the fuse module may be embodied in many different forms and should not be construed as being limited to the embodiments set forth herein. Rather, these embodiments are provided so that this disclosure will convey certain exemplary aspects of the fuse module to those skilled in the art.

Referring to FIGS. 1A and 1B, perspective views illustrating a fuse module 10 in accordance with an exemplary, non-limiting embodiment of the present disclosure is shown. For the sake of convenience and clarity, terms such as "front," "rear," "top," "bottom," "side," "above," and "below" may be used herein to describe the relative placement and orientation of various components of the fuse module 10, all with respect to the geometry and orientation of the fuse module 10 as it appears in FIGS. 1A and 1B. Said terminology will include the words specifically mentioned, derivatives thereof, and words of similar import.

The fuse module 10 may generally include a sealable, inline fuse holder 12 (hereinafter "the fuse holder 12") and a fuse 14 removably disposed within the fuse holder 12. The fuse holder 12 may include integrated first and second electrical cables 15a, 15b for connecting the fuse module 10 within an electrical circuit (e.g., electrically in series between a source of electrical power and a load) as described in greater detail below.

Referring to FIGS. 2A-2C, several views illustrating the fuse 14 and its components are shown. The fuse 14 may include a mounting block 16 formed of an electrically insulating material, and a fuse plate 18 that extends around several surfaces of the mounting block 16. Particularly, the fuse plate 18 (which is shown in isolation in FIG. 2C for clarity) may include a rear portion 18a disposed on a rear surface 16a of the mounting block 16, a front portion 18b disposed on a front surface 16b of the mounting block 16, opposite the rear surface 16a, and a fusible element 18c disposed on or adjacent a top surface 16c of the mounting block 16 and connecting the rear portion 18a to the front portion 18b. The mounting block 16 may include a through hole 20 extending between and through the rear surface 16a and the front surface 16b, and the rear and front portions 18a, 18b of the fuse plate 18 may include respective first and second through holes 22a, 22b that are aligned with the through hole 20 of the mounting block 16. The mounting block 16 may further include an insulating cover 26 (shown in FIG. 2A and omitted in FIG. 2B) that fits over the fusible element 18c and attaches to the top surface 16c of the mounting block 16 (e.g., via snap fit, mechanical fasteners, etc.).

The fusible element 18c may be configured to melt, disintegrate, or otherwise open if current flowing through fuse plate 18 exceeds a predetermined threshold, or "current rating," of the fuse 14. In various examples, the fusible element 18c may include perforations, slots, thinned or narrowed segments, and/or various other features for making the fusible element 18c more susceptible to melting or opening than other portions of the fuse plate 18. As shown in FIG. 2C, the fusible element 18c may have a generally X-shaped configuration. The present disclosure is not limited in this regard.

Referring to FIG. 3A, the fuse holder 12 may be a substantially hollow body having the shape of a rectangular cuboid, and may include a main body portion 30 and a cap 32 removably couplable to the main body portion 30, such as via snap fit, friction fit, etc. When the cap 32 is coupled to the main body portion 30 and the fuse 14 is installed within the fuse holder 12 (as shown in FIG. 1A and as further described below) the interior of the fuse holder 12 may define a fluidically sealed volume. The cap 32 may be connected to the main body portion 30 by a flexible, integrally formed lanyard 34. The present disclosure is not limited in this regard. The internal dimensions of the fuse holder 12 may be adapted to accommodate the fuse 14 in a close clearance relationship therewith as further described below. The fuse holder 12 may be formed of rubber or other resilient, electrically insulating material.

The fuse holder 12 may further include integrally formed first and second electrical cable collars 36a, 36b extending from a rear edge and a front edge of the main body portion 30, respectively, for holding terminal ends of respective first and second electrical cables 15a, 15b. The first and second electrical cables 15a, 15b may be shielded and may terminate in respective electrically conductive first and second ring terminals 38a, 38b (as best shown in the isolated view of the first and second electrical cables 15a, 15b in FIG. 3B) that extend into the interior of the main body portion 30. The first and second ring terminals 38a, 38b may be disposed in flat abutment with interior surfaces of rear and front walls 40a, 40b of the main body portion 30, respectively. The first and second ring terminals 38a, 38b may be aligned with (e.g., concentric with) first and second through holes 42a, 42b formed in the rear and front walls 40a, 40b. In various embodiments, the main body portion 30 may be overmolded onto the first and second electrical cables 15a, 15b, and the first and second ring terminals 38a, 38b may be recessed within, and may have exposed surfaces that are coplanar with, the interior surfaces of the rear and front walls 40a, 40b of the main body portion 30. The present disclosure is not limited in this regard.

Figure 4B:
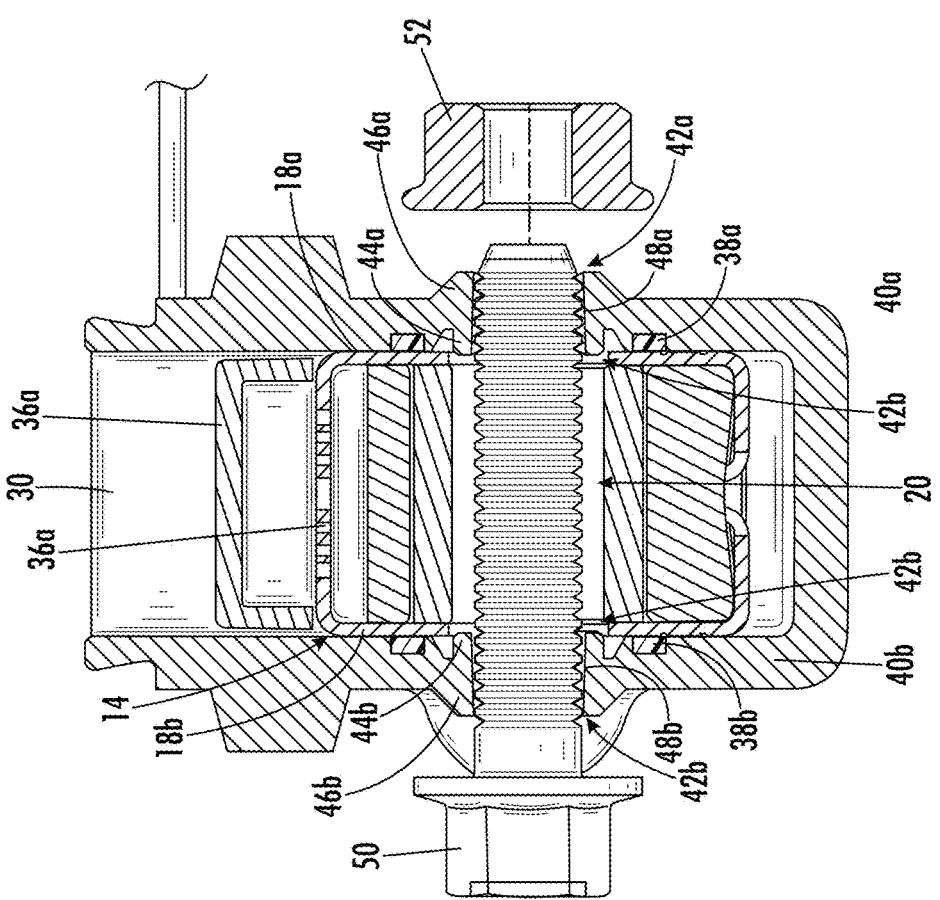

Referring to FIGS. 4A and 4B, cross-sectional views illustrating the fuse 14 disposed within the fuse holder 12 in unfastened and fastened states, respectively, are shown. As shown in FIG. 4A, the fuse 14 may be disposed within the main body portion 30, with the rear portion 18a of the fuse plate 18 disposed in flat abutment with the interior surface of the rear wall 40a and in direct contact with the first ring terminal 38a, and with the front portion 18b of the fuse plate 18 disposed in flat abutment with the interior surface of the front wall 40b and in direct contact with the second ring terminal 38b. The fusible element 18c and the cover 26 may face up, toward the open top of the main body portion 30. The present disclosure is not limited in this regard. The through hole 20 of the mounting block 16 may be aligned with (e.g., concentric with) the first and second ring terminals 38a, 38b and the first and second through holes 42a, 42b in the rear and front walls 40a, 40b of the main body portion 30.

The main body portion 30 may include first and second annular lips 44a, 44b extending from the interior surfaces of the rear and front walls 40a, 40b around the first and second through holes 42a, 42b, respectively. Outer diameters of the first and second annular lips 44a, 44b may be smaller than diameters of the through holes 22a, 22b in the rear and front portions 18a, 18b of the fuse plate 18 and smaller than the diameter of the through hole 20 of the mounting block 16. The main body portion 30 may further include first and second annular raised portions 46a, 46b extending from the exterior surfaces of the rear and front walls 40a, 40b around the first and second through holes 42a, 42b, respectively. The first annular lip 44a and the first raised portion 46a may together define a first interior surface 48a of the first through hole 42a, and the second annular lip 44b and the second raised portion 46b may together define a second interior surface 48b of the second through hole 42b. The first and second interior surfaces 48a, 48b may be sloped or angled such that the first and second through holes 42a, 42b may be larger at the interior surfaces of the rear and front walls 40a, 40b and smaller at the exterior surfaces of the rear and front walls 40a, 40b.

During installation of the fuse 14 within the fuse holder 12, a bolt 50 may be inserted through each of the second through hole 42b in the front wall 40b of the main body portion 30, the second through hole 22b in the front portion 18b of the fuse plate 18, the through hole 20 in the mounting block 16, the first through hole 22a in the rear portion 18a of the fuse plate 18, and the first through hole 42a in the rear wall 40a of the main body portion 30 as shown in FIG. 4A. A nut 52 may then be tightened onto the protruding end of the bolt 50. As the nut 52 is tightened, the nut 52 and the head of the bolt 50 may bear against the first and second annular raised portions 46a, 46b and may compress the first and second annular raised portions 46a, 46b toward one another. The compression of the first and second annular raised portions 46a, 46b may cause the first and second annular lips 44a, 44b to be pressed into the annular gaps between the bolt 50 and the rear and front portions 18a, 18b of the fuse plate 18, respectively, as shown in FIG. 4B. The first and second annular lips 44a, 44b may thereby provide electrically insulating annular barriers between the bolt 50 and the fuse plate 18. Additionally, the compression of the first and second annular raised portions 46a, 46b may cause the angled first and second interior surfaces 48a, 48b of the first and second through holes 42a, 42b to be pressed firmly against the bolt 50 to establish fluid-tight seals between the angled interior surfaces 48a, 48b and the bolt. The installation of the fuse 14 may be completed by fitting the cap 32 of the fuse holder 12 onto the main body portion 30 as shown in FIG. 1A.

Figure 5B:
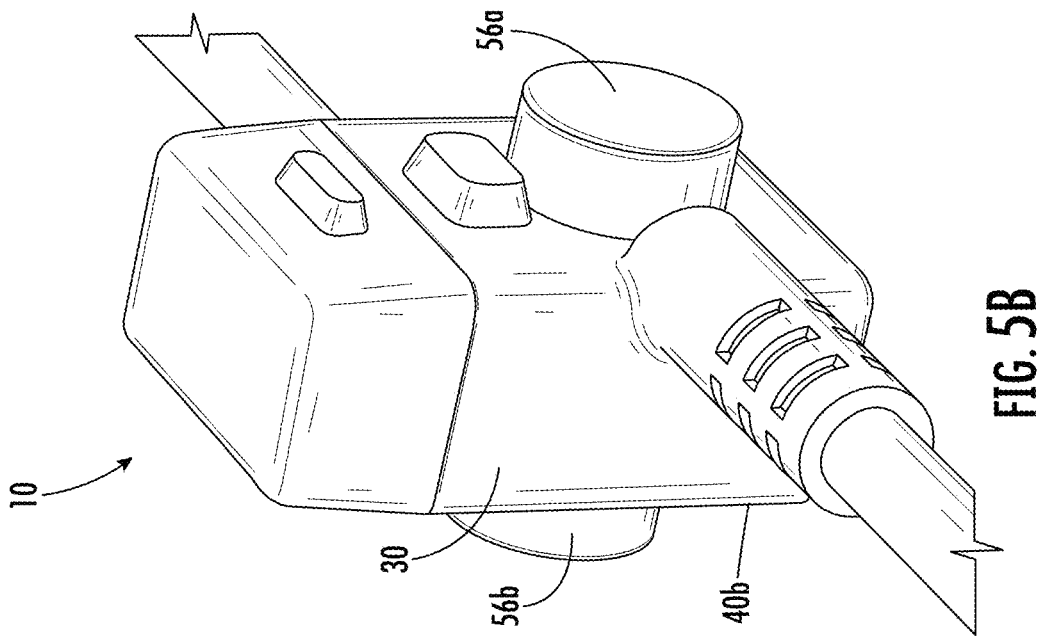
FIGS. 5A and 5B are perspective views illustrating the fuse module shown in FIGS. 1A and 1B with optional bolt caps.
Figure 5A:
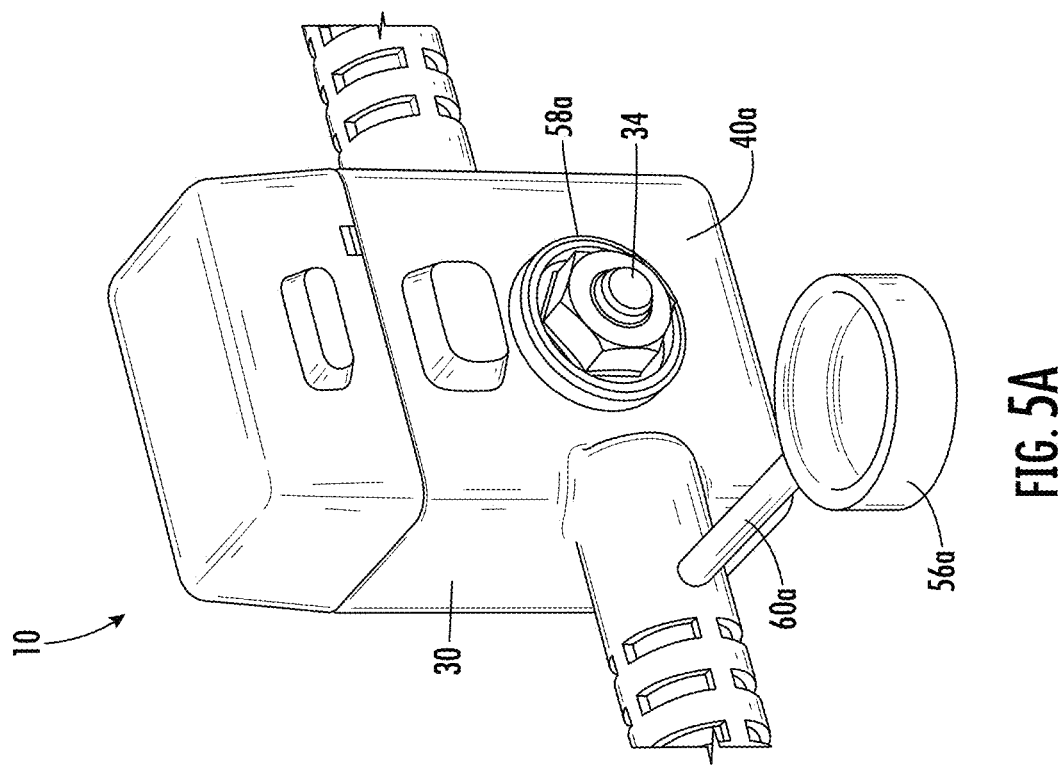

Referring to FIGS. 5A and 5B, an embodiment of the fuse module 10 is shown that includes removable bolt caps 56a, 56b for covering the nut 52 and the head of the bolt 50 (not within view). The bolt caps 56a, 56b may be beneficial for applications in which fluidic sealing of fuse holder 12 is a critical requirement. The bolt caps 56a, 56b may be integrally formed with the main body portion 30 of the fuse holder 12 (e.g., during molding of the main body portion 30) and may be couplable to annular flanges that are also integrally formed with the main body portion 30 and that surround the nut 52 and the head of the bolt 50, such as via friction fit, interference fit, etc. Only one annular flange 58a on the rear wall 40a of the main body portion 30 is within view in FIG. 5A. It will be understood that a substantially identical annular flange is formed on the front wall 40b of the main body portion 30. In various embodiments, the bolt caps 56a, 56b may be connected to the main body portion 30 by integrally formed lanyards as shown in FIG. 5A. Only one lanyard 60a extending from the rear of the main body portion 30 is within view in FIG. 5A. It will be understood that a substantially identical lanyard may connect the bolt cap 56b to the front of the main body portion 30. In various embodiments the lanyards may be omitted as in FIG. 5B.

During normal operation of the fuse module 10, the first and second electrical cables 15a, 15b may be connected within an electrical circuit (e.g., to a battery and a load, respectively) and current may flow through the first and second electrical cables 15a, 15b and the fuse plate 18 of the fuse 14. Upon the occurrence of an overcurrent condition, the fusible element 18c of the fuse plate 18 may melt or otherwise separate, thereby breaking the current path in the fuse plate 18 and arresting the flow of electrical current through the first and second electrical cables 15a, 15b. The battery, load, and other electrical components are thereby protected from damage that could otherwise occur if the overcurrent condition were allowed to persist. Subsequently, the cap 32 and the bolt 50 may be removed from the main body portion 30 of the fuse holder 12, and the fuse 14 may be removed and replaced with a new fuse to reestablish the circuit.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A fuse module comprising:
   a fuse holder comprising:
      a main body portion formed of an electrically insulating material, the main body portion defining a hollow interior and having first and second through holes formed in opposing rear and front walls thereof, respectively, the first and second through holes being aligned with one another;
      an integrated first electrical cable having a first ring terminal extending into the hollow interior of the main body portion, the first ring terminal disposed on the rear wall and aligned with the first through hole in the rear wall; and
      an integrated second electrical cable having a second ring terminal extending into the hollow interior of the main body portion, the second ring terminal disposed on the front wall and aligned with the second through hole in the front wall;
   a fuse disposed within the fuse holder, the fuse comprising:
      a mounting block formed of an electrically insulating material and having a through-hole extending therethrough, the through hole of the mounting block being aligned with the first and second through holes in the rear and front walls of the main body portion; and
      a fuse plate having a rear portion disposed on a rear surface of the mounting block, in contact with the first ring terminal, and having a first through hole aligned with the through hole of the mounting block, a front portion disposed on a front surface of the mounting block, in contact with the second ring terminal, and having a second through hole aligned with the through-hole of the mounting block, and a fusible element disposed adjacent a top surface of the mounting block and connecting the rear portion of the fuse plate to the front portion of the fuse plate; and
   a bolt extending through the front wall, the second ring terminal, the front portion of the fuse plate, the mounting block, the rear portion of the fuse plate, the first ring terminal, and the rear wall, the bolt secured by a nut on an exterior of the rear wall.

2. The fuse module of claim 1, wherein the fuse holder further comprises a cap removably coupled to an open end of the main body portion.

3. The fuse module of claim 2, wherein the cap is attached to the main body portion by an integrated lanyard.

4. The fuse module of claim 1, wherein the first ring terminal is recessed within the rear wall and the second ring terminal is recessed within the front wall.

5. The fuse module of claim 1, wherein the fuse holder further comprises an integrated first cable collar extending from the main body portion and surrounding a portion of the first electrical cable and an integrated second cable collar extending from the main body portion and surrounding a portion of the second electrical cable.

6. The fuse module of claim 1, wherein the fuse holder further comprises:

a first annular lip extending from an interior surface of the rear wall of the main body portion and surrounding the first through hole in the rear wall, wherein the first annular lip extends into a gap between the bolt and the first ring terminal; and a second annular lip extending from an interior surface of the front wall of the main body portion and surrounding the second through hole in the front wall, wherein the second annular lip extends into a gap between the bolt and the second ring terminal.

7. The fuse module of claim 6, wherein:

the first annular lip is movable between a first position wherein the first annular lip does not extend into a gap between the bolt and the first ring terminal and a second position wherein the first annular lip extends into the gap between the bolt and the first ring terminal; and the second annular lip is movable between a first position wherein the second annular lip does not extend into a gap between the bolt and the second ring terminal and a second position wherein the second annular lip extends into the gap between the bolt and the second ring terminal.

8. The fuse module of claim 7, wherein the fuse holder further comprises:

a first annular raised portion extending from an exterior surface of the rear wall of the main body portion and surrounding the first through hole in the rear wall; and a second annular raised portion extending from an exterior surface of the front wall of the main body portion and surrounding the second through hole in the front wall;

wherein compression of the first annular raised portion toward the rear wall causes the first annular lip to move from the first position to the second position; and wherein compression of the second annular raised portion toward the front wall causes the second annular lip to move from the first position to the second position.

9. The fuse module of claim 7, wherein the fuse holder further comprises:

a first annular raised portion extending from an exterior surface of the rear wall of the main body portion and surrounding the first through hole in the rear wall; and a second annular raised portion extending from an exterior surface of the front wall of the main body portion and surrounding the second through hole in the front wall;

wherein compression of the first annular raised portion toward the rear wall causes the first annular lip to engage and form a seal against the bolt; and wherein compression of the second annular raised portion toward the front wall causes the second annular lip to engage and form a seal against the bolt.

10. The fuse module of claim 1, wherein the fuse holder further comprises:

a first annular flange extending from an exterior surface of the rear wall of the main body portion and surrounding the first through hole in the rear wall;

a first bolt cap coupled to the first annular flange and covering the nut;

a second annular flange extending from an exterior surface of the front wall of the main body portion and surrounding the second through hole in the front wall; and a second bolt cap coupled to the second annular flange and covering a head of the bolt.

11. The fuse module of claim 10, wherein the first and second bolt caps are attached to the main body portion by integrated lanyards.

12. A fuse holder comprising:

a main body portion formed of an electrically insulating material, the main body portion defining a hollow interior and having first and second through holes formed in opposing rear and front walls thereof, respectively, the first and second through holes being aligned with one another;

an integrated first electrical cable having a first ring terminal extending into the hollow interior of the main body portion, the first ring terminal disposed on the rear wall and aligned with the first through hole in the rear wall;

an integrated second electrical cable having a second ring terminal extending into the hollow interior of the main body portion, the second ring terminal disposed on the front wall and aligned with the second through hole in the front wall a first annular flange extending from an exterior surface of the rear wall of the main body portion and surrounding the first through hole in the rear wall;

a first bolt cap removably couplable to the first annular flange for covering the first through hole in the rear wall;

a second annular flange extending from an exterior surface of the front wall of the main body portion and surrounding the second through hole in the front wall; and a second bolt cap removably couplable to the second annular flange for covering the second through hole in the front wall.

13. The fuse holder of claim 12, wherein the fuse holder further comprises a cap removably coupled to an open end of the main body portion.

14. The fuse holder of claim 13, wherein the cap is attached to the main body portion by an integrated lanyard.

15. The fuse holder of claim 12, wherein the first ring terminal is recessed within the rear wall and the second ring terminal is recessed within the front wall.

16. The fuse holder of claim 12, wherein the fuse holder further comprises an integrated first cable collar extending from the main body portion and surrounding a portion of the first electrical cable and an integrated second cable collar extending from the main body portion and surrounding a portion of the second electrical cable.

17. The fuse holder of claim 12, wherein the fuse holder further comprises:

a first annular lip extending from an interior surface of the rear wall of the main body portion and surrounding the first through hole in the rear wall; and a second annular lip extending from an interior surface of the front wall of the main body portion and surrounding the second through hole in the front wall.

18. The fuse holder of claim 17, wherein the fuse holder further comprises:

a first annular raised portion extending from an exterior surface of the rear wall of the main body portion and surrounding the first through hole in the rear wall; and a second annular raised portion extending from an exterior surface of the front wall of the main body portion and surrounding the second through hole in the front wall;

wherein compression of the first annular raised portion toward the rear wall causes the first annular lip to move toward the front wall; and wherein compression of the second annular raised portion toward the front wall causes the second annular lip to move toward the rear wall.

19. The fuse holder of claim 12, wherein the first and second bolt caps are attached to the main body portion by integrated lanyards.

* * * * *